United States Patent [19]

Kozakai et al.

[11] Patent Number: 5,244,733

[45] Date of Patent: Sep. 14, 1993

[54] OPTICAL FIBERS AND CORE-FORMING COMPOSITIONS

[75] Inventors: Shohei Kozakai, Annaka; Tomiya Abe, Hitachi, both of Japan

[73] Assignee: Shin-Etsu Chemical Company, Limited, Tokyo, Japan

[21] Appl. No.: 873,116

[22] Filed: Apr. 24, 1992

[30] Foreign Application Priority Data

Apr. 24, 1991 [JP] Japan .................................. 3-122257

[51] Int. Cl.$^5$ ........................ D02G 3/16; C08G 77/60
[52] U.S. Cl. .................................... 428/378; 428/391; 428/394; 428/397; 528/35; 528/31; 528/32; 528/15; 556/432; 556/435
[58] Field of Search ....................... 528/35, 31, 32, 15; 556/432, 435; 428/378, 391, 394, 397

[56] References Cited

U.S. PATENT DOCUMENTS

| | | | |
|---|---|---|---|
| 2,888,475 | 5/1959 | Plueddemann | 556/432 |
| 3,162,663 | 12/1964 | Beck | 528/35 |
| 3,527,781 | 9/1970 | Levin | 528/35 |
| 4,761,458 | 8/1988 | Burns et al. | 525/474 |

FOREIGN PATENT DOCUMENTS

| | | |
|---|---|---|
| 0153414 | 4/1985 | European Pat. Off. . |
| 60-43613 | 5/1985 | Japan . |
| 2-200757 | 8/1990 | Japan . |
| 084108 | 3/1992 | Japan . |

OTHER PUBLICATIONS

*Patent Abstracts of Japan,* vol. 14, No. 332 (P-1077) (4275), Jul. 17, 1990 & JP-A-2 111 903, Apr. 24, 1990.

*Primary Examiner*—John C. Bleutge
*Assistant Examiner*—Margaret W. Glass
*Attorney, Agent, or Firm*—Birch, Stewart, Kolasch & Birch

[57] ABSTRACT

A polysilylethylene arylene polymer having an alkoxy or aryloxy group as a side chain substituent is used to form optical fiber cores which do not significantly increase their light transmission loss under an external pressure applied thereto even when exposed to a humid condition.

10 Claims, No Drawings

OPTICAL FIBERS AND CORE-FORMING COMPOSITIONS

This invention relates to an optical fiber core-forming composition comprising a polysilylethylene arylene polymer. It also relates to an optical fiber having a core formed of the polymer.

BACKGROUND OF THE INVENTION

As is well known in the art, optical fibers include glass base optical fibers using quartz glass and multi-component glass as core and clad components and plastic optical fibers using plastics as core and clad components. As compared with the former, the plastic optical fibers have some drawbacks including an increased transmission loss undesirable for long distance communications, but some advantages including an increase of numerical aperture, ease of handling, and low cost.

Conventional plastic optical fibers generally include cores formed of organic polymers having high light transmittance and clads formed of highly transparent organic polymers having a lower index of refraction than the core polymers. The organic polymers having high light transmittance suitable as the core are typically poly(methyl methacrylate) and polystyrene. It was recently proposed to use organopolysiloxane elastomers as the core material as disclosed in Japanese Patent Application Kokai (JP-A) No. 43613/1985. Advantageously, plastic optical fibers using such elastomer cores have higher flexibility and higher thermal resistance than those using poly(methyl methacrylate) and other conventional core materials.

Nevertheless, the use of organopoly-siloxane elastomers as the optical fiber core has the drawback that external pressure applied to the optical fibers causes the elastomeric cores to deform, resulting in an increased loss of light transmission. It is thus desired to eliminate this drawback.

SUMMARY OF THE INVENTION

Therefore, an object of the present invention is to provide a polymer composition which experiences only a small light transmission loss even when exposed to high humidity so that the composition is highly suitable for forming optical fiber cores. Another object of the invention is to provide an optical fiber having a core formed from the polymer composition.

The inventors previously proposed in JP-A 200757/1990 an optical fiber core-forming composition comprising a polysilyethylene arylene polymer having a recurring unit of the general formula (III) or (IV):

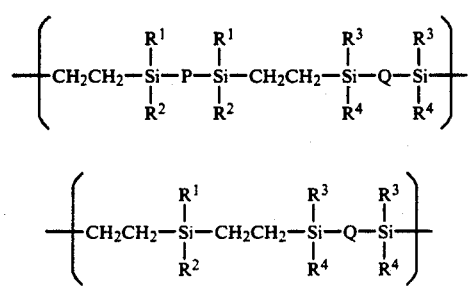

wherein $R^1$, $R^2$, $R^3$ and $R^4$ each are a monovalent hydrocarbon group, and P and Q each are a divalent aromatic hydrocarbon group. Optical fibers using this composition as the core component experience only a slight loss of light transmission under pressure applied externally thereto.

Continuing investigations on this core-forming composition, we have found that by introducing an alkoxy or aryloxy group in the recurring unit of formula (III) or (IV) as a side chain substituent, there is obtained a core-forming composition which experiences only a slight increase of light transmission loss under external pressure and is resistant against moisture in that the light transmission loss remains small even when exposed to high humidity for an extended period of time.

Accordingly, the present invention provides a composition for forming optical fiber cores comprising an organic silicon polymer having a recurring unit of the general formula (I) or (II):

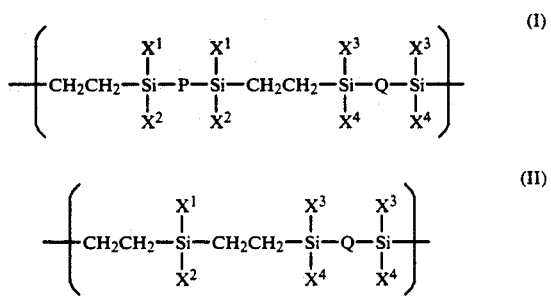

wherein $X^1$, $X^2$, $X^3$ and $X^4$ are independently selected from the group consisting of a monovalent hydrocarbon group, an alkoxy group, and an aryloxy group, at least one of $X^1$, $X^2$, $X^3$ and $X^4$ is an alkoxy or aryloxy group, and P and Q are independently selected from divalent aromatic hydrocarbon groups. The terms polymer designates both a homopolymer and a copolymer.

Also contemplated herein is an optical fiber comprising a core and a clad thereon wherein the core is formed of the composition defined above.

DETAILED DESCRIPTION OF THE INVENTION

The composition for forming optical fiber cores according to the present invention contains as a main component an organic silicon polymer having a recurring unit of the general formula (I) or (II).

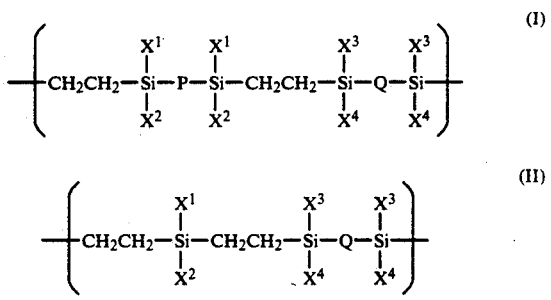

In formulae (I) and (II), $X^1$, $X^2$, $X^3$ and $X^4$ are independently selected from the group consisting of a monovalent hydrocarbon group, an alkoxy group, and an aryloxy group, at least one of $X^1$, $X^2$, $X^3$ and $X^4$ is an alkoxy or aryloxy group, P and Q are independently selected from divalent aromatic hydrocarbon groups.

The preferred hydrocarbon groups represented by X's are those having 1 to 10 carbon atoms, more preferably 1 to 6 carbon atoms. Exemplary are alkyl groups such as methyl, ethyl and propyl, aryl groups such as phenyl, tolyl and xylyl, and aralkyl groups such as benzyl and phenylethyl, with the methyl and phenyl groups being most preferred. The alkoxy and aryloxy groups represented by X's include substituted or unsubstituted alkoxy groups having 1 to 10 carbon atoms such as methyoxy, ethoxy, propoxy, methoxyethoxy, ethoxyethoxy, and phenoxymethoxy groups and substituted or unsubstituted aryloxy groups having 6 to 12 carbon atoms such as phenoxy, methylphenoxy and naphthoxy groups, with the methoxy and ethoxy groups being preferred.

In the organic silicon compounds of formulae (I) and (II), at least one of $X^1$, $X^2$, $X^3$ and $X^4$ is an alkoxy or aryloxy group. In order that the core-forming composition have increased humidity resistance, it is essential to introduce an alkoxy or aryloxy group as a side chain substituent in formulae (I) and (II). The content of an alkoxy or aryloxy group in the organic silicon compound of formula (I) and (II) is preferably at least 5 mol %, more preferably at least 10 mol % based on the overall side chain substituents. Less than 5 mol % of an alkoxy or aryloxy group on this basis would improve humidity resistance to a less extent.

Linkages P and Q are independently divalent aromatic hydrocarbon groups, preferably having 6 to 20 carbon atoms, more preferably 6 to 15 carbon atoms. Examples are given below.

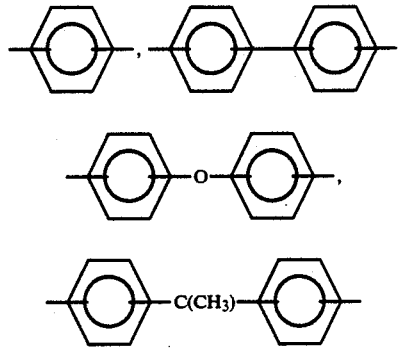

Illustrative, non-limiting examples of the organic silicon polymer or copolymer having recurring units of formulae (I) and (II) are compounds of formulae (A) through (J) as shown below.

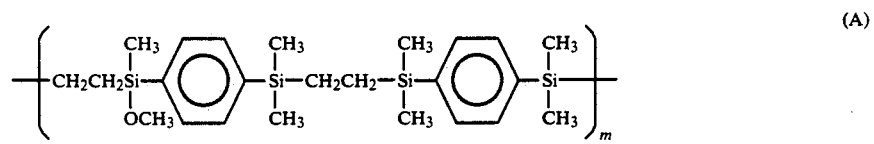
(A)

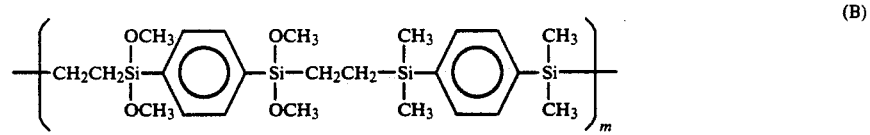
(B)

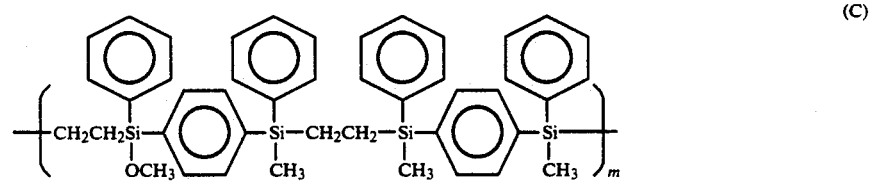
(C)

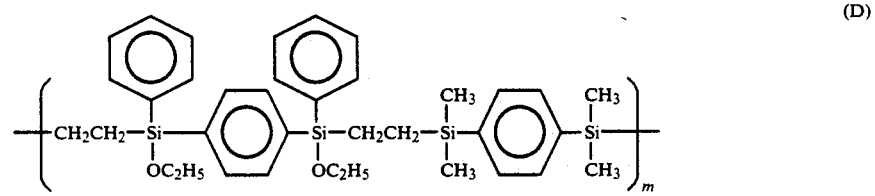
(D)

-continued
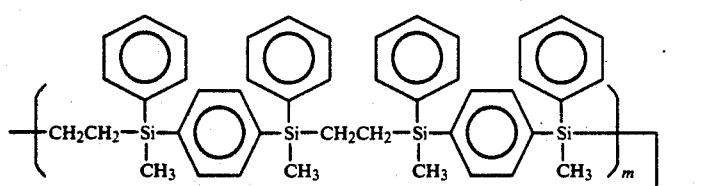
(E)
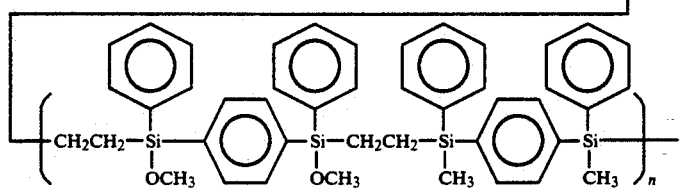
(F)
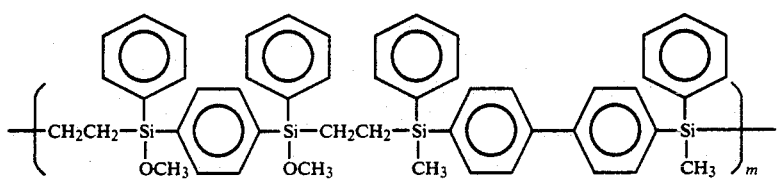
(G)
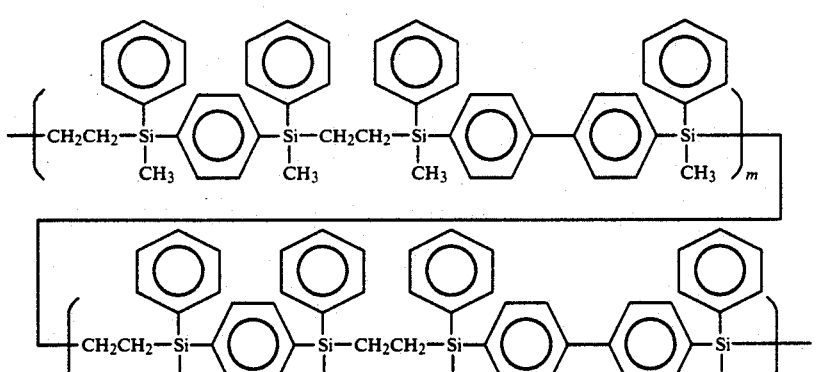
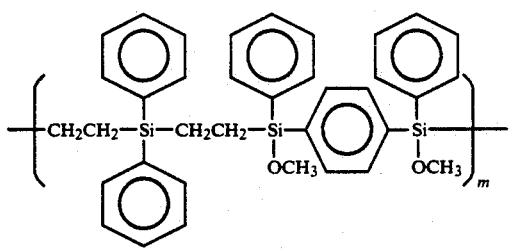
(H)
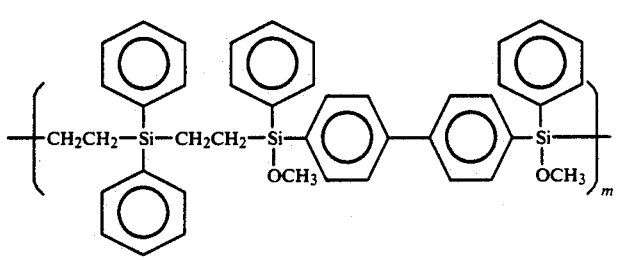
(I)

-continued

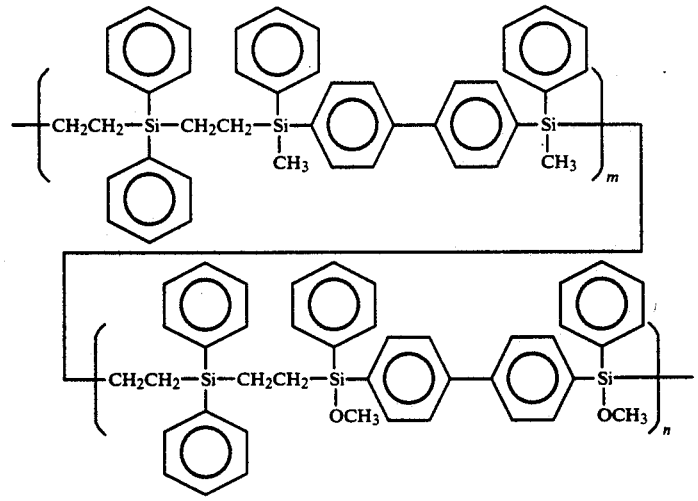
(J)

In the formulae, m and n are positive integers, preferably from 10 to 1,000.

Another useful organic silicon polymer is a crosslinked polymer having a unit represented by the following formula (K) wherein n is as defined above.

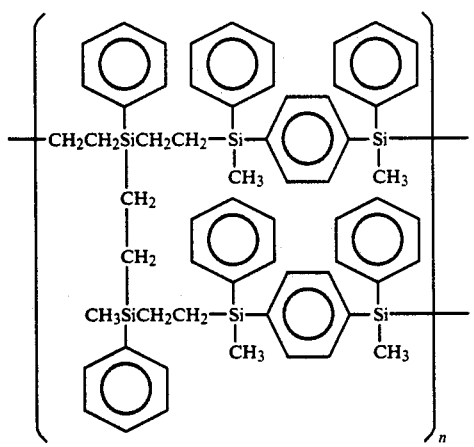
(K)

The organic silicon polymers of formulae (A) to (J) can be synthesized by effecting hydrosilylation between a vinyl-containing organic silicon compound of formula (V) or (VI) and an organic silicon compound of formula (VII) in the presence of a platinum catalyst.

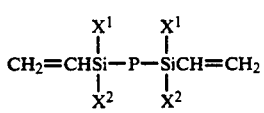
(V)

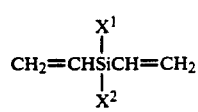
(VI)

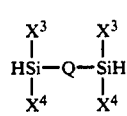
(VII)

The crosslinked polymer represented by formula (N) can be synthesized by effecting the same hydrosilylation as above in the copresence of an organic silicon compound of formula (VIII) or (IX).

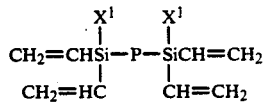
(VIII)

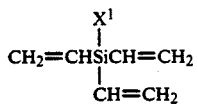
(IX)

The platinum catalysts which can be used herein include conventional platinum catalysts such as platinum black and chloroplatinic acid, preferably those which are soluble in the hydrosilylation reaction system, for example, alcohol and silicone-modified solutions of chloroplatinic acid. The platinum catalyst is used in a catalytic amount, typically 0.01 to 100 ppm of platinum based on the total weight of the reactants. Since platinum let in the core can adversely affect the light transmission of optical fibers, the amount of platinum catalyst should be as small as possible. Thus the platinum catalyst is preferably used in an amount of 0.01 to 5 ppm of platinum based on the total weight of the reactants.

Typically, the optical fiber has a core of a circular cross section and a concentric clad enclosing the core. The core is mainly formed of the organic silicon polymer or copolymer of the invention. The clad may be formed from any desired one of well-known plastic materials, for example, fluorinated polymers such as polytetrafluoroethylene, tetrafluoroethylene/perfluoroalkylvinylether copolymers, tetrafluoroethylene/hexafluoropropylene copolymers, polychlorotrifluoroethylene, tetrafluoroethylene/ethylene copolymers, polyvinyl fluoride, polyvinylidene fluoride, and tetrafluoroethylene/vinylidene fluoride copolymers, polyamide resins, polyimide resins, polyamidimide resins, epoxy resins, and polyalkyl siloxane rubbers.

Optical fibers are manufactured by first synthesizing an organic silicon polymer through hydrosilylation reaction as mentioned above, heating and melting the polymer, spinning a molten cladding material into a hollow tube, and simultaneously introducing the molten polymer into the tube. Alternatively, a mixture of a precursor of a polymer of formula (A) to (J) and a platinum catalyst is forced into a preformed tube of cladding material where the precursor is heat polymerized.

The core-forming composition of the present invention ensures the manufacture of humidity resistant optical fibers which experience a minimal increase in light transmission loss under external pressure applied thereto and little increase in light transmission loss even when exposed to high humidity for a long time. Optical fibers having a core formed of the composition of the present invention are thus of high quality and find a wide variety of applications.

EXAMPLE

Examples of the present invention are given below together with comparative examples by way of illustration and not by way of limitation. All parts are by weight.

EXAMPLE 1

A polymerizable composition was prepared by mixing 11.8 parts of a vinyl-containing organic silicon compound having formula (L) and 17.5 parts of an organic silicon compound having formula (M) and adding an octyl alcohol modified solution of chloroplatinic acid to the mixture so as to provide 1 ppm of platinum based on the weight of the mixture.

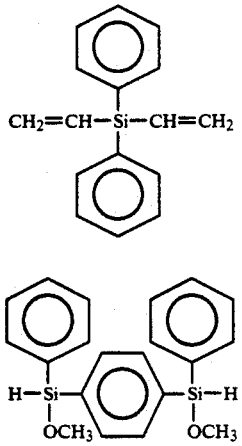

EXAMPLE 2

A polymerizable composition was prepared by mixing 11.8 parts of a vinyl-containing organic silicon compound having formula (L) and 18.9 parts of an organic silicon compound having formula (N) and adding an octyl alcohol modified solution of chloroplatinic acid to the mixture so as to provide 1 ppm of platinum based on the weight of the mixture.

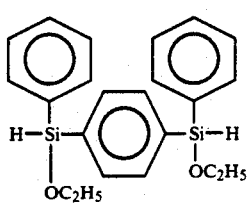

EXAMPLE 3

A polymerizable composition was prepared by mixing 20.1 parts of a vinyl-containing organic silicon compound having formula (R) and 19.7 parts of an organic silicon compound having formula (S) and adding an octyl alcohol modified solution of chloroplatinic acid to the mixture so as to provide 1 ppm of platinum based on the weight of the mixture.

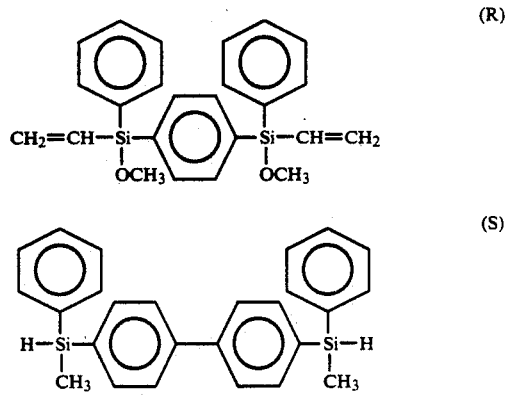

EXAMPLE 4

A polymerizable composition was prepared by mixing 11.8 parts of a vinyl-containing organic silicon compound having formula (L), 5.25 parts of an organic silicon compound having formula (M), and 11.13 parts of an organic silicon compound having formula (T) and adding an octyl alcohol modified solution of chloroplatinic acid to the mixture so as to provide 1 ppm of platinum based on the weight of the mixture.

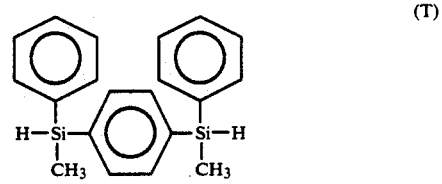

EXAMPLE 5

A polymerizable composition was prepared by mixing 11.8 parts of a vinyl-containing organic silicon compound having formula (L), 1.75 parts of an organic silicon compound having formula (M), and 14.31 parts of an organic silicon compound having formula (T) and adding an octyl alcohol modified solution of chloroplatinic acid to the mixture so as to provide 1 ppm of platinum based on the weight of the mixture.

EXAMPLE 6

A polymerizable composition was prepared by mixing 11.8 parts of a vinyl-containing organic silicon compound having formula (L), 1.05 parts of an organic silicon compound having formula (M), and 14.946 parts of an organic silicon compound having formula (T) and adding an octyl alcohol modified solution of chloroplatinic acid to the mixture so as to provide 1 ppm of platinum based on the weight of the mixture.

COMPARATIVE EXAMPLE

A polymerizable composition was prepared by mixing 11.8 parts of a vinyl-containing organic silicon compound having formula (L) and 15.9 parts of an organic silicon compound having formula (T) and adding an octyl alcohol modified solution of chloroplatinic acid to the mixture so as to provide 1 ppm of platinum based on the weight of the mixture.

Next, each of the polymerizable compositions obtained in Examples 1 to 6 and Comparative Example was forcedly introduced into a fluororesin tube having an inner diameter of 1.5 mm and an outer diameter of 2.2 mm, and heated at 80° C. for 12 hours and then at 150° C. for 48 hours for polymerizing and curing the contents. There were obtained optical fibers.

An external compressive force having a load varying from 0 to 100 kg as shown in Table 1 was applied to each optical fiber at the center portion (50 mm) for measuring a change of light quantity transmittee by the fiber. The results are shown in Table 1.

Separately, the optical fibers obtained from the compositions of Examples 1 to 4 and Comparative Example were exposed to an environment of 60° C. and RH 90% for 72 hours, and then allowed to stand at room temperature for 2 hours. The light quantity transmitted by the fibers was measured before and after the humidity test. The results are shown in Table 2. It is to be noted that the percent substitution of alkoxy group reported in Table 2 is a theoretical value calculated from the mixing components of the polymerizable composition.

TABLE 1

| Load | Light quantity retention (%) | | | | | | |
|---|---|---|---|---|---|---|---|
| (kg) | E1 | E2 | E3 | E4 | E5 | E6 | CE |
| 0 | 100 | 100 | 100 | 100 | 100 | 100 | 100 |
| 10 | 100 | 98 | 100 | 100 | 100 | 100 | 100 |
| 20 | 97 | 98 | 99 | 99 | 100 | 100 | 97 |
| 30 | 95 | 96 | 97 | 98 | 99 | 100 | 96 |
| 40 | 93 | 94 | 98 | 96 | 97 | 98 | 93 |
| 50 | 90 | 91 | 96 | 95 | 95 | 97 | 88 |
| 60 | 89 | 88 | 93 | 93 | 94 | 96 | 87 |
| 70 | 87 | 85 | 91 | 92 | 92 | 93 | 84 |
| 80 | 83 | 82 | 88 | 89 | 89 | 90 | 81 |
| 90 | 80 | 80 | 87 | 87 | 87 | 88 | 80 |
| 100 | 78 | 79 | 84 | 86 | 85 | 86 | 78 |

TABLE 2

| | Alkoxy substitution | Light quantity retention (%) | |
|---|---|---|---|
| | (mol %) | Initial | After 72 hours |
| E1 | 33.33 | 100 | 88 |
| E2 | 33.33 | 100 | 84 |
| E3 | 25 | 100 | 72 |
| E4 | 10 | 100 | 61 |
| CE | 0 | 100 | 0 |

It is evident from Tables 1 and 2 that the optical fibers each having a core formed of core material comprising an alkoxy group-containing polysilylethylene arylene polymer (Examples 1 to 4) do not significantly increase light transmission loss even when allowed to stand under a humid condition for a long time, as compared with the alkoxy group-free polysilylethylene arylene polymer (Comparative Example).

Although some preferred embodiments have been described, many modifications and variations may be made thereto in the light of the above teachings. It is therefore to be understood that within the scope of the appended claims, the invention may be practiced otherwise than as specifically described.

We claim:

1. An optical fiber having a core which comprises an organic silicon polymer having a recurring unit of the general formula (I) or (II):

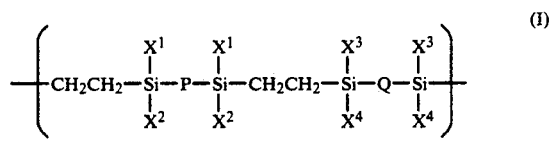

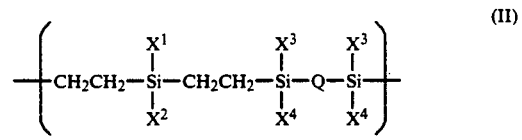

wherein $X^1$, $X^2$, $X^3$ and $X^4$ are independently selected from the group consisting of a mono-valent hydrocarbon group, an alkoxy group, and an aryloxy group, at least one of $X^1$, $X^2$, $X^3$ and $X^4$ is an alkoxy or aryloxy group, P and Q are independently selected from divalent aromatic hydrocarbon groups.

2. The optical fiber of claim 1 wherein the content of alkoxy or aryloxy group in the organic silicon polymer is at least 5 mol % based on the overall side chain substituents.

3. The optical fiber of claim 1 wherein said organic silicon polymer of formula (I) or (II) is selected from the group consisting of:

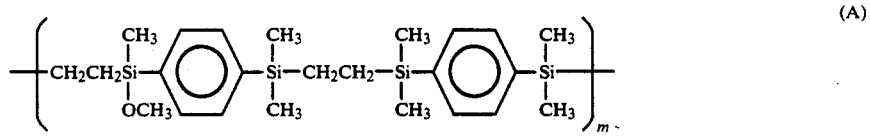

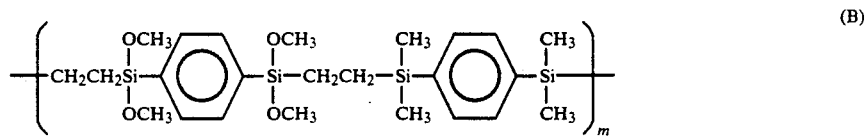

-continued
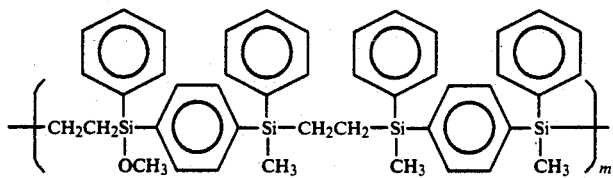
(C)
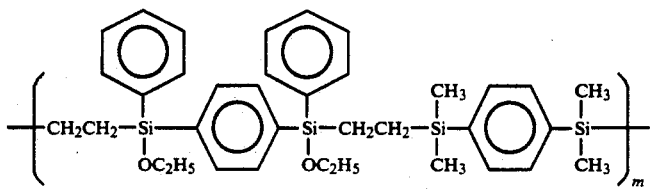
(D)
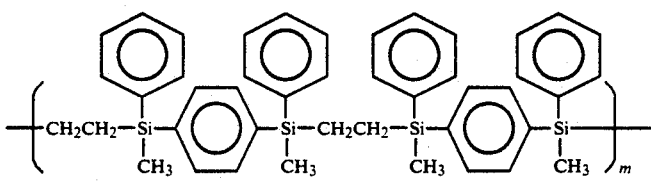
(E)
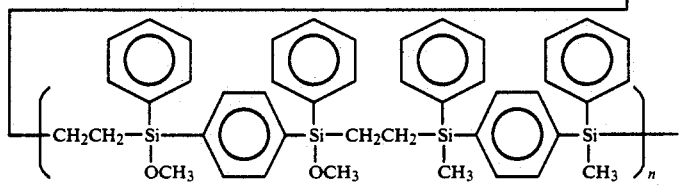
(F)
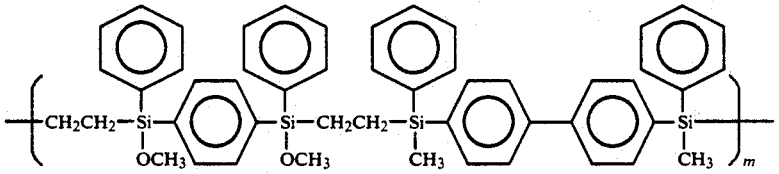
(G)
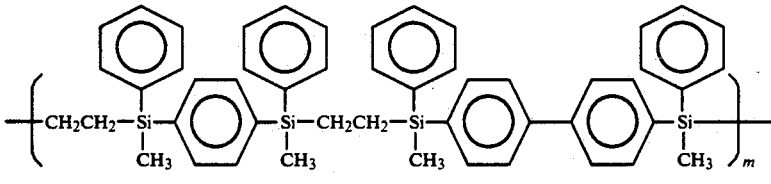
(H)
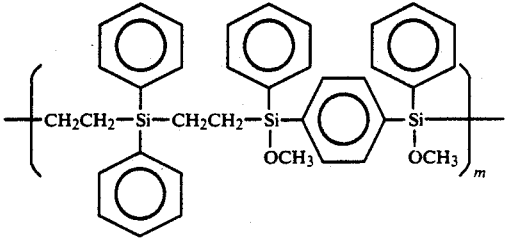

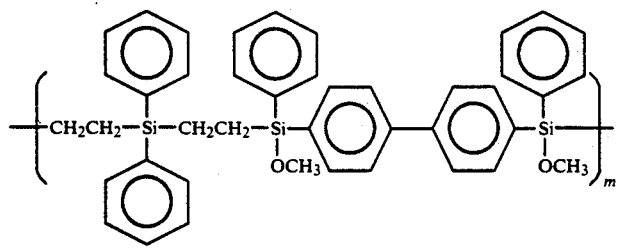

and

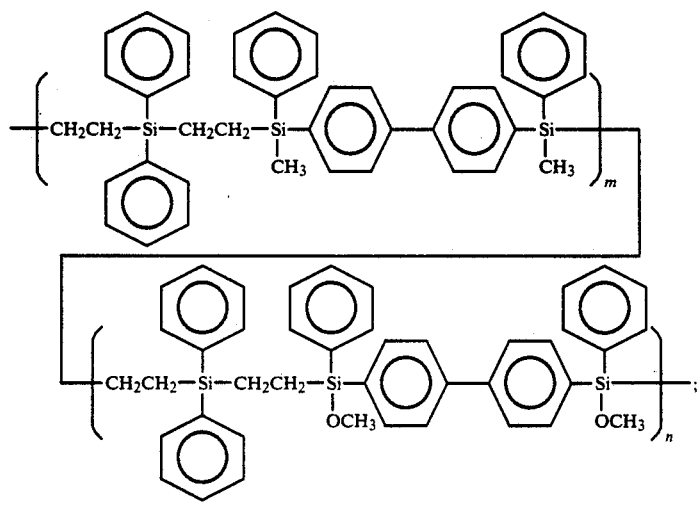

wherein m and n are positive integers from 10 to 1,000.

4. The optical fiber of claim 3 wherein said organic silicon polymer core has a circular cross-section and a concentric clad enclosing said core wherein the clad is formed of a plastic material selected from the group consisting of: polytetrafluoroethylene, tetrafluoroethylene/perfluoroalkylvinylether copolymers, tetrafluoroethylene/hexafluoropropylene copolymers, polychlorotrifluoroethylene, tetrafluoroethylene/ethylene copolymers, polyvinyl fluoride, polyvinylidene fluoride, tetrafluoroethylene/vinylidene fluoride copolymers, polyamide resins, polyimide resins, polyamidimide resins, epoxy resins, and polyalkyl siloxane rubbers.

5. The optical fiber of claim 1 wherein said organic silicon polymer core has a circular cross-section and a concentric clad enclosing said core.

6. The optical fiber of claim 5 wherein said clad is formed of a plastic material selected from the group consisting of: polytetrafluoroethylene, tetrafluoroethylene/perfluoroalkylvinylether copolymers, tetrafluoroethylene/hexafluoropropylene copolymers, polychlorotrifluoroethylene, tetrafluoroethylene/ethylene copolymers, polyvinyl fluoride, polyvinylidene fluoride, tetrafluoroethylene/vinylidene fluoride copolymers, polyamide resins, polyimide resins, polyamidimide resins, epoxy resins, and polyalkyl siloxane rubbers.

7. The optical fiber of claim 1 wherein the organic silicon polymer is formed by reacting mixtures of compounds of the formulae (L) and (M) as follows:

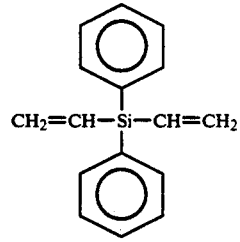

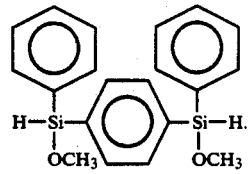

8. The optical fiber of claim 1 wherein the organic silicon polymer is formed by reacting mixtures of compounds of the formulae (L) and (N) as follows:

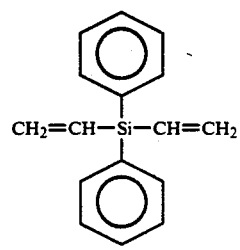

(N)
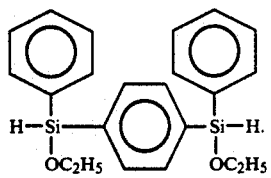
9. The optical fibers of claim 1 wherein the organic silicon polymer is formed by reacting mixtures of compounds of the formulae (R) and (S) as follows:
(R)
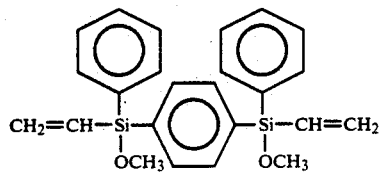
(S)
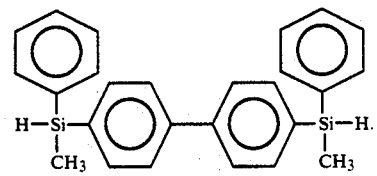
10. The optical fibers of claim 1 wherein the organic silicon polymer is formed by reacting mixtures of compounds of the formulae (L), (M) and (T) as follows:
(L)
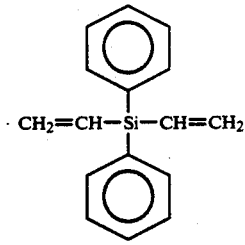
(M)
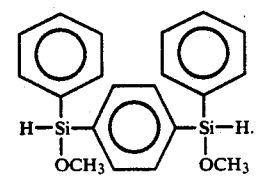
(T)
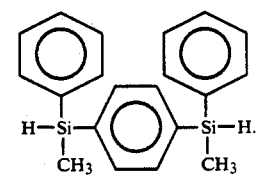
* * * * *